United States Patent [19]

Niwa et al.

[11] Patent Number: 4,760,133
[45] Date of Patent: Jul. 26, 1988

[54] PROCESS FOR PREPARING DISAZO DYES WITH BIS-ANILINO METHANE COUPLING COMPONENT

[75] Inventors: Toshio Niwa; Kiyoshi Himeno, both of Yokohama; Shuichi Maeda, Saiatama; Yukiharu Shimizu, Yokohama, all of Japan

[73] Assignee: Research Association of Synthetic Dyestuffs, Tokyo, Japan

[21] Appl. No.: 457,872

[22] Filed: Jan. 14, 1983

[30] Foreign Application Priority Data

Jan. 28, 1982 [JP]  Japan .................................. 57-12083

[51] Int. Cl.$^4$ ..................... C09B 31/12; C09B 39/00; C09B 41/00; C09B 43/00
[52] U.S. Cl. ................................ 534/588; 534/753; 534/761; 534/775; 534/791; 534/887
[58] Field of Search ..................... 260/152, 157, 158; 534/588, 761

[56] References Cited

U.S. PATENT DOCUMENTS

| | | | |
|---|---|---|---|
| 989,953 | 4/1911 | Dressel et al. | 260/158 |
| 4,180,503 | 12/1979 | Vor der Bruck et al. | 260/152 |
| 4,207,233 | 6/1980 | Seybold et al. | 260/158 |

OTHER PUBLICATIONS

Pinnow, Ber. Deut. Chem. Gesell., vol. 27, pp. 3161 to 3167 (1894).
Scharwin et al., Ber. Deut Chem Gesell., vol. 41, pp. 2056 to 2060 (1908).
Ziegler et al., Monatshefte fur Chem., vol. 84, pp. 610 to 618 (1953).
Zollinger, "Azo and Diazo Chemistry", p. 239 (1961).

*Primary Examiner*—Floyd D. Higel

[57] ABSTRACT

A process for preparing a disazo dye represented by the following formula:

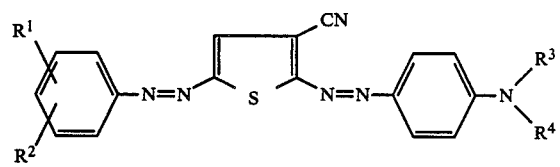

wherein $R^1$ and $R^2$ each represents a hydrogen atom, a halogen atom, a nitro group, a trifluoromethyl group, a lower alkoxycarbonyl group or a lower alkylsulfonyl group, $R^3$ represents a lower alkyl or allyl group which may optionally have a substituent or substituents, and $R^4$ represents a lower alkyl or allyl group having a substituent or substituents, which comprises diazotizing an amine represented by the following formula:

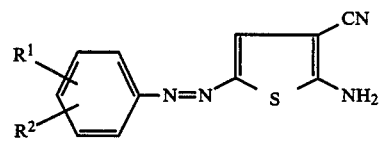

wherein $R^1$ and $R^2$ are the same as defined above, and coupling the diazotized product with a bis(N,N-di-substituted anilino)methane represented by the following formula:

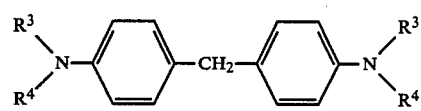

wherein $R^3$ and $R^4$ are the same as defined above.

1 Claim, No Drawings

PROCESS FOR PREPARING DISAZO DYES WITH BIS-ANILINO METHANE COUPLING COMPONENT

FIELD OF THE INVENTION

The present invention relates to a novel process for preparing disazo dyes.

BACKGROUND OF THE INVENTION

Hetero ring-containing disazo dyes have excellent fastness properties to light and particularly show a high molar absorption coefficient and a large color value, and hence they have been noted as disperse dyes of navy color for polyester fibers.

Many reports have already been made as to the process for preparing the hetero ring-containing disazo dyes (for example, Japanese Patent Application (OPI) Nos. 41734/76 and 33225/78 (the term "OPI" as used herein refers to a "published unexamined Japanese patent application")), but conventional processes difficultly provide the dyes in satisfactorily high yield with, particularly, high purity.

SUMMARY OF THE INVENTION

As a result of intensive investigations to find a process for obtaining the above-described hetero ring-containing disazo dyes in high yield with high purity, it has been found that highly pure disazo dyes can be obtained in extremely high yield by coupling a diazonium salt of a diazo component, hetero ring-containing amine, with a diphenylmethane type amine, because this reaction proceeds with depressing side reactions, thus having achieved the present invention.

Accordingly, an object of the present invention is to provide a novel process for preparing disazo dyes represented by the following formula (I):

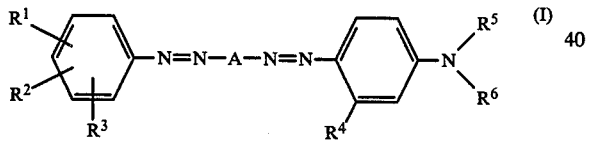

wherein $R^1$, $R^2$ and $R^3$ each represents a hydrogen atom, a halogen atom, a nitro group, a cyano group, a trifluoromethyl group, a lower alkyl group, a lower alkoxy group, a lower alkoxycarbonyl group, a lower alkylsulfonyl group, an N,N-di-lower alkylsulfamoyl group or a lower acylamino group; A represents

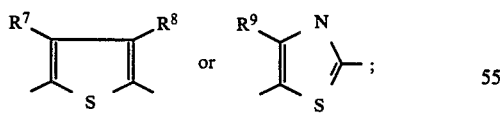

$R^7$ represents a hydrogen atom, a phenyl group, a lower alkyl group or a lower alkoxycarbonylalkyl group; $R^8$ represents a cyano group, a nitro group, a lower alkoxycarbonyl group, a lower alkylsulfonyl group, a carbamoyl group, an N-lower alkylcarbamoyl group or an N,N-di-lower alkylcarbamoyl group; $R^9$ represents a hydrogen atom, a lower alkyl group, or a phenyl or thienyl group which may optionally be substituted by a lower alkyl group, a lower alkoxy group, a halogen atom or an acyl group; $R^4$ represents a hydrogen atom, a hydroxy group, a methyl group, a chlorine atom or an acylamino group; and $R^5$ and $R^6$ each represents a hydrogen atom, a substituted or unsubstituted alkyl group, a cyclohexyl group, an alkenyl group or an aryl group.

This object can be easily attained by diazotizing an amine represented by the following formula (II):

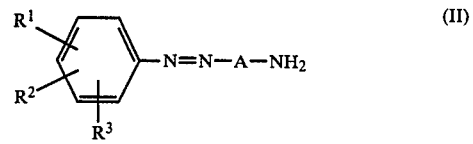

wherein $R^1$, $R^2$, $R^3$ and A are the same as defined above, and coupling the diazotized product with a diphenylamine type amine represented by the following formula (III):

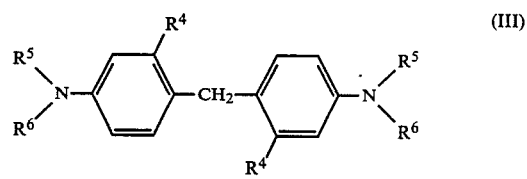

wherein $R^4$, $R^5$ and $R^6$ are the same as defined above.

DETAILED DESCRIPTION OF THE INVENTION

Specific examples of the amine represented by the formula (II) which can be used as a diazo component in the process of the present invention are shown below.

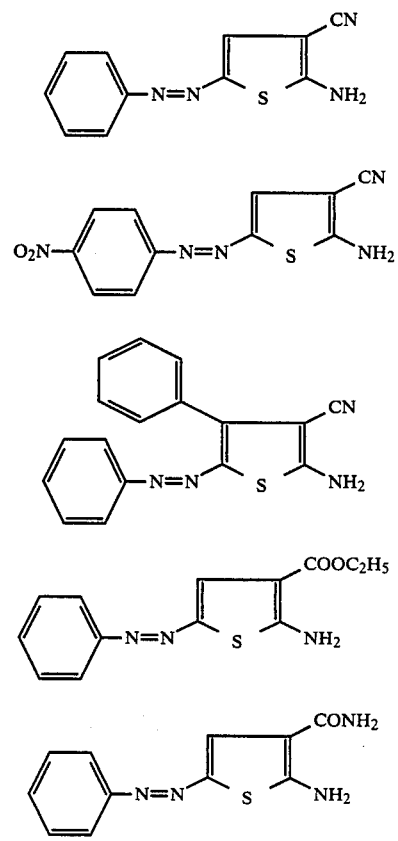

-continued

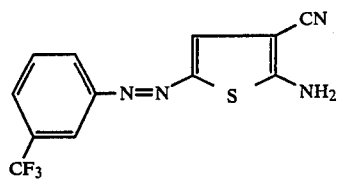
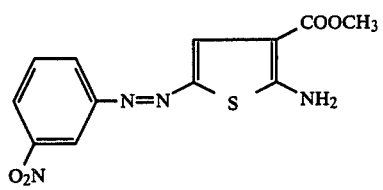
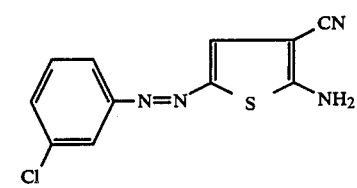
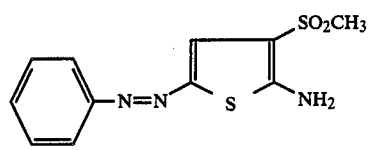
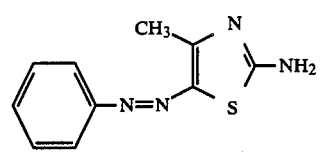
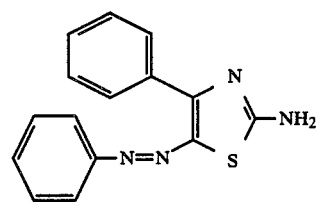
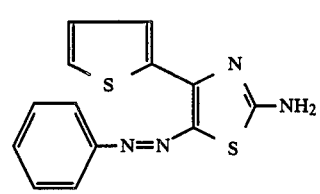
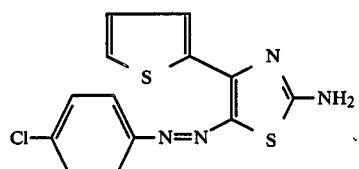

-continued

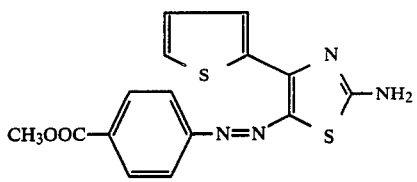

Specific examples of the diphenylmethane type amine represented by the formula (III) which can be used as a coupling component are shown in Table 1 below.

TABLE 1

$$\text{R}^5\text{R}^6\text{N}-\text{C}_6\text{H}_3(\text{R}^4)-\text{CH}_2-\text{C}_6\text{H}_3(\text{R}^4)-\text{NR}^5\text{R}^6$$

| $R^4$ | $R^5$ | $R^6$ |
|---|---|---|
| H | $C_2H_5$ | $C_2H_4CN$ |
| H | $C_2H_5$ | $CH_2-C_6H_5$ |
| H | $C_2H_5$ | $C_2H_4OH$ |
| H | $CH_3$ | $CH_3$ |
| H | $C_2H_4OCOCH_3$ | $C_2H_4OCOCH_3$ |
| $CH_3$ | $C_2H_4OCH_3$ | $C_2H_4OCH_3$ |
| H | $CH_2CH=CH_2$ | $C_2H_4CN$ |
| OH | $C_2H_5$ | $C_2H_5$ |
| H | $C_2H_5$ | $C_2H_5$ |
| $CH_3$ | $C_2H_5$ | $C_2H_4OH$ |
| $NHCOCH_3$ | $C_2H_5$ | $C_2H_5$ |
| H | $C_2H_5$ | tetrahydrofurfuryl ($CH_2$-CH(O)-) |
| H | H | cyclohexyl |
| H | $C_2H_5$ | $C_2H_4O$-phenyl |
| H | $C_2H_5$ | $C_2H_4OCH_3$ |
| Cl | $C_2H_4OCOCH_3$ | $C_2H_4OCOCH_3$ |
| H | $C_2H_5$ | $C_2H_4COOCH_3$ |
| H | $C_2H_4COOCH_3$ | $C_2H_4COOCH_3$ |
| H | $C_2H_5$ | $C_2H_4OCOCH_3$ |
| $CH_3$ | $C_4H_9$ | $C_3H_6COOC_2H_5$ |
| $CH_3$ | $C_3H_6COOCH_3$ | $C_3H_6COOCH_3$ |
| H | $C_2H_4OCOOC_2H_5$ | $C_2H_5OCOOC_2H_5$ |

According to the process of the present invention, desired disazo dyes can be obtained in high yield with high purity by diazotizing an amine represented by the formula (II) in conventional manner, adding the resulting diazo solution to a solution of a diphenylmethane type amine represented by the formula (III) (coupling component) in water or in a mixture of a water-miscible organic solvent (e.g., an alcohol such as methanol or ethanol; an N-alkylformamide such as dimethylformamide; an N-alkylpyrrolidone such as N-methylpyrrolidone; a ketone such as acetone or methyl ethyl ketone; etc.) with water, adjusting, if desired or necessary, pH of the resulting mixed solution to facilitate the coupling reaction, and isolating the thus obtained disazo dye.

The disazo dyes represented by the formula (I) which can be obtained by the process of the present invention can dye synthetic fibers composed of synthetic or semi-synthetic high polymer, such as polyester fibers, polyacrylonitrile fibers, polyurethane fibers, triacetate fibers, diacetate fibers, etc., to a navy color with good fastness properties.

The present invention will now be described in more detail by the following preferable embodiments of the present invention which, however, are not to be construed as limiting the present invention. Unless otherwise indicated, all percents, parts, ratios and the like are by weight.

EXAMPLE 1

2.0 g of sodium nitrite was added to 28.8 ml of 98% sulfuric acid, and the mixture was heated to 55° C. to dissolve sodium nitrite in the sulfuric acid to prepare nitrosylsulfuric acid. The resulting solution was cooled. At 5° to 10° C., 9.12 g of acetic acid was added thereto and then at 0° to 5° C., 40% sulfuric acid was added dropwise thereto.

4.56 g of a compound represented by the following formula:

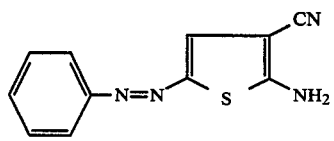

(I)

was further added thereto and, after stirring the mixture at −2° to 0° C. for 2 hours, 1.0 g of urea was added thereto to prepare a diazo solution.

On the other hand, 89.1 g of 98% sulfuric acid was added to 200 ml of water, and 174 g of N-ethyl-N-cyanoethylaniline was added to the mixture at room temperature, followed by stirring the mixture at room temperature to dissolve N-ethyl-N-cyanoethylaniline. Then, 60.9 g of an aqueous formalin solution (37% grade) was added thereto, and the mixture was reacted at 60° C. for 7 hours. After cooling the reaction solution to room temperature, the solution was neutralized with sodium acetate, and extracted with chloroform. After removing the solvent from the extract, an oily product represented by the following formula (II):

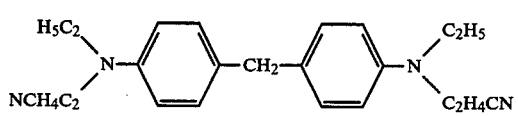

(II)

was obtained.

The above-described chemical structure was confirmed by NMR analysis in which a proton peak showing the central methylene group was observed at 3.76 ppm and by mass spectrum analysis in which a parent peak was observed at 360 M+/e.

5.94 g of the compound represented by the formula (II) was dissolved in 500 ml of methanol to prepare a coupling solution.

To this coupling solution was added the diazo solution obtained above at 0° to 5° C. over 30 minutes, and the resulting solution was further stirred for 5 hours. Crystals precipitated were collected by filtration, washed with water, and dried to obtain 7.90 g of a disazo compound represented by the following formula:

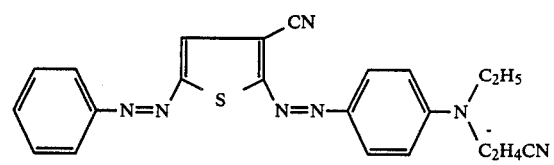

This disazo compound showed a maximum absorption at a wavelength of 605 nm (in 80 volume % acetone aqueous solution), and purity analysis by high-speed liquid chromatography revealed that the compound was highly pure.

When polyester fibers were dyed at a high temperature (130° C.) with the dye obtained in this Example, a navy color cloth having a good light fastness was obtained.

EXAMPLE 2

A diazo solution was prepared from the monoazo compound of the formula (I) in the same manner as in Example 1.

On the other hand, 7.16 g of a compound represented by the following formula:

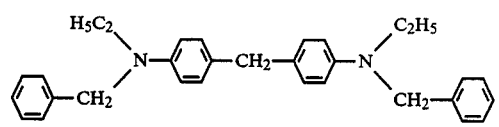

was dissolved in 500 ml of 3% sulfuric acid to prepare a coupling solution.

To this coupling solution was added the diazo solution obtained above at 0° to 5° C. over 30 minutes, and the resulting solution was further stirred for 8 hours. Crystals precipitated were collected by filtration, washed with water, and dried to obtain 8.58 g of a disazo compound represented by the following formula:

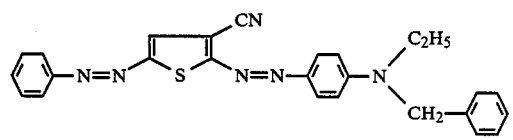

This disazo compound showed a maximum absorption at a wavelength of 620 nm (in a 80 volume % acetone aqueous solution), and purity analysis by high-speed liquid chromatography revealed that the produced compound was highly pure.

When polyester fibers were dyed at a high temperature (130° C.) with the dye obtained in this Example, a navy color cloth having a good light fastness was obtained.

EXAMPLE 3

A diazo solution was prepared from the monoazo compound of the formula (I) in the same manner as in Example 1.

Separately, 5.64 g of a compound represented by the following formula:

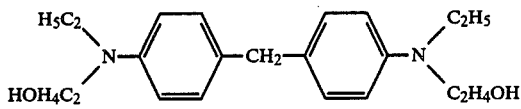

was dissolved in 300 ml of 3% sulfuric acid to prepare a coupling solution.

To this coupling solution was added dropwise the diazo solution obtained above at 0° to 5° C. over 20 minutes, and the resulting solution was further stirred for 8 hours. Crystals precipitated were collected by filtration, washed with water, and dried to obtain 7.67 g of a disazo compound represented by the following formula:

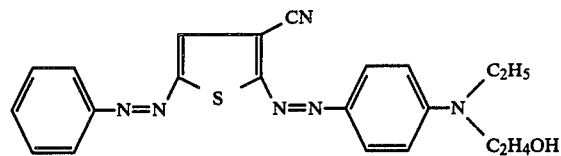

This disazo compound showed a maximum absorption at a wavelength of 638 nm (in 80 volume % acetone aqueous solution), and purity analysis of the compound by high-speed liquid chromatography revealed that the compound was highly pure.

When polyester fibers were dyed at a high temperature (130° C.) with the dye obtained in this Example, a navy color cloth having a good light fastness was obtained.

EXAMPLE 4

Example 1 was followed except for using 8.94 g of a compound represented by the following formula (III) as a coupling component:

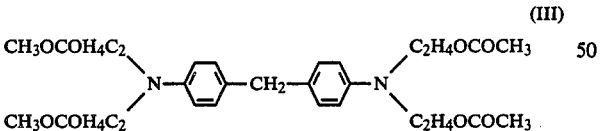

to obtain 9.57 g of black crystals of a dye represented by the following formula:

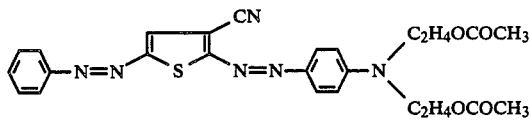

This disazo compound showed a maximum absorption at a wavelength of 605 nm (in 80 volume % acetone aqueous solution), and purity analysis of the compound by high-speed liquid chromatography revealed that the compound was highly pure.

When polyester fibers were dyed at a high temperature with the dye obtained in this Example, a navy color cloth having a good light fastness was obtained.

Additionally, the compound of the formula (III) was prepared as follows.

128.5 g of acetic anhydride was added to 108.6 g of a compound represented by the following formula:

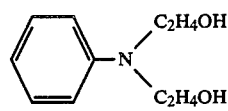

and reacted at 100° C. for 2 hours. Subsequently, 80.3 g of an aqueous formalin solution (containing 37% formalin) was added thereto, and the resulting mixture was reacted at 80° C. for 7 hours. Thus, an acetic acid solution containing the compound represented by the formula (III) was obtained. This solution was used directly in the subsequent step.

EXAMPLE 5

Example 1 was followed except for using 5.46 g of a compound represented by the following formula as a diazo component:

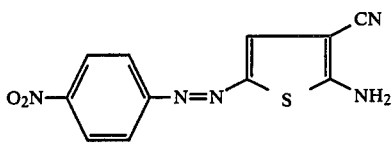

to obtain 8.66 g of black crystals of a dye represented by the following formula:

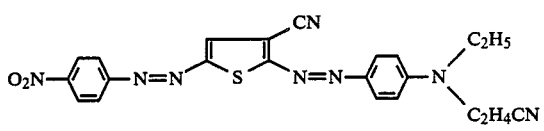

This disazo compound showed a maximum absorption at a wavelength of 630 nm (in 80 volume % acetone aqueous solution), and purity analysis of the compound revealed that the compound was highly pure.

When polyester fibers were dyed at a high temperature with the dye obtained in this Example, a navy color cloth having a good light fastness was obtained.

EXAMPLE 6

Example 1 was followed except for using compounds shown in Table 2 below as coupling components and diazo components to obtain disazo dyes shown in Table 2 below. When polyester fibers were dyed with each of the dyes, dyed products showing a color tone shown in Table 2 below were obtained.

TABLE 2

Diazo Component

Phenyl–N=N– [thiophene with CN at 3-position, NH₂ at 2-position]

Coupling Component

$R^3R^4N$–C₆H₄–CH₂–C₆H₄–$NR^3R^4$

Disazo Dye

Phenyl–N=N–[thiophene: 3-CN]–N=N–C₆H₄–$NR^3R^4$

| No. | –R³ | –R⁴ | λmax | Color Tone (polyester fibers) |
|---|---|---|---|---|
| 6-1 | –CH₂CH=CH₂ | –C₂H₄CN | 597 | navy |
| 6-2 | –C₂H₅ | –CH₂–(tetrahydrofuryl) | 632 | " |
| 6-3 | –C₂H₅ | –C₂H₄O–phenyl | 628 | " |
| 6-4 | " | –C₂H₄OCH₃ | 631 | " |
| 6-5 | " | –C₂H₄OCOCH₃ | 618 | " |
| 6-6 | " | –C₂H₄COOCH₃ | 618 | " |
| 6-7 | –C₂H₄COOCH₃ | " | 605 | " |
| 6-8 | –C₂H₄OCOOC₂H₅ | –C₂H₄OCOOC₂H₅ | 605 | " |
| 6-9 | –C₂H₄CN | –C₂H₄OH | 601 | " |
| 6-10 | " | –C₄H₉(n) | 608 | " |

EXAMPLE 7

Example 1 was followed except for using compounds shown in Table 3 below as coupling components and diazo components to obtain disazo dyes shown in Table 3 below. When polyester fibers were dyed with each of the dyes, dyed products showing a color tone shown in Table 3 below were obtained.

TABLE 3

Diazo Component

$R^2,R^1,R$-substituted phenyl–N=N–[thiophene: 3-CN, 2-NH₂]

Coupling Component

(H₅C₂)(NCH₄C₂)N–C₆H₄–CH₂–C₆H₄–N(C₂H₅)(C₂H₄CN)

Disazo Dye

$R^2,R$-substituted C₆H₃–N=N–[thiophene: CN]–N=N–C₆H₄–N(C₂H₅)(C₂H₄CN)

| No. | –R | –R¹ | –R² | λmax | Color Tone (polyester fibers) |
|---|---|---|---|---|---|
| 7-1 | –CF₃ | –H | –H | 618 | navy |
| 7-2 | –Cl | " | " | 615 | " |
| 7-3 | –H | " | –COOCH₃ | 623 | " |
| 7-4 | " | " | –COOC₂H₅ | 623 | " |
| 7-5 | " | " | –SO₂CH₃ | 628 | " |
| 7-6 | " | " | –SO₂C₂H₅ | 628 | " |
| 7-7 | " | –Cl | –Cl | 618 | " |
| 7-8 | " | " | –NO₂ | 638 | " |
| 7-9 | " | " | –SO₂CH₃ | 631 | " |

EXAMPLE 8

Example 1 was followed except for using compounds shown in Table 4 below as coupling components and diazo components to obtain disazo dyes shown in Table 4 below. When polyester fibers were dyed with each of the dyes, dyed products showing a color tone shown in Table 4 below were obtained.

TABLE 4

Diazo Component

$R^1$–C₆H₄–N=N–[thiophene: 3-CN, 2-NH₂]

Coupling Component

$R^3R^4N$–C₆H₄–CH₂–C₆H₄–$NR^3R^4$

Disazo Dye

$R^1$–C₆H₄–N=N–[thiophene: CN]–N=N–C₆H₄–$NR^3R^4$

| No. | –R¹ | –R³ | –R⁴ | λmax | Color Tone (polyester fibers) |
|---|---|---|---|---|---|
| 8-1 | –Cl | –C₂H₅ | –C₂H₄OCOCH₃ | 625 | navy |
| 8-2 | –SO₂CH₃ | " | " | 640 | " |
| 8-3 | –NO₂ | " | " | 651 | " |

TABLE 4-continued

Diazo Component

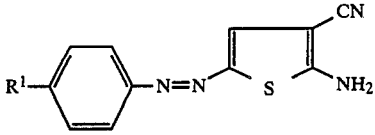

Coupling Component

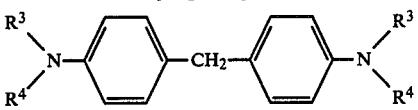

Disazo Dye

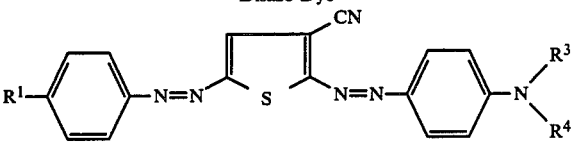

| No. | $-R^1$ | $-R^3$ | $-R^4$ | λmax | Color Tone (polyester fibers) |
|---|---|---|---|---|---|
| 8-4 | $-COOCH_3$ | " | $-C_2H_4COOCH_3$ | 639 | " |
| 8-5 | " | $-C_2H_4COOCH_3$ | " | 631 | " |
| 8-6 | $-NO_2$ | $-C_4H_9(n)$ | $-C_2H_4CN$ | 638 | " |
| 8-7 | " | $-C_2H_4OCH_3$ | $-C_2H_4OCOCH_3$ | 642 | " |
| 8-8 | " | $-C_2H_4OCOCH_3$ | " | 635 | " |

EXAMPLE 9 AND COMPARATIVE EXAMPLE 1

Disazo dyes were preapred in the same manner as in Example 1 except for using 20 mmols of 2-amino-3-cyano-5-phenylazothiophene as a diazo component and 30 mmols of an aniline or 15 mmols of a dianilinomethane shown in Table 5 below as a coupling component.

Purities and yields (crude yield × purity) of the thus obtained disazo dyes are shown in Table 5.

TABLE 5

| | Coupling Component | | R³R⁴N-C₆H₄-CH₂-C₆H₄-NR³R⁴ | | R³R⁴N-C₆H₅ | |
|---|---|---|---|---|---|---|
| No. | $-R^3$ | $-R^4$ | Purity (%) | Yield (%) | Purity (%) | Yield (%) |
| 1 | $-C_2H_4OCOCH_3$ | $-C_2H_4OCOCH_3$ | 85.4 | 86.0 | 67.5 | 61.2 |
| 2 | $-C_4H_9(n)$ | $-C_2H_4CN$ | 78.5 | 88.4 | 68.0 | 75.5 |
| 3 | $-C_2H_4OH$ | " | 77.3 | 79.3 | 56.7 | 48.7 |
| 4 | $-C_2H_5$ | " | 75.4 | 80.6 | 60.0 | 63.0 |
| 5 | " | $-C_2H_4OCOCH_3$ | 68.5 | 61.5 | 56.0 | 45.8 |
| 6 | $-CH_3$ | $-CH_3$ | 38.1 | 33.1 | 33.5 | 27.4 |

COMPARATIVE EXAMPLE 2

The same procedures as described in Example 9 and Comparative Example 1 were repeated except for using coupling components shown in Table 6.

Purities and yields of the thus obtained disazo dyes are shown in Table 6.

TABLE 6

| | Coupling Component | | | Purity (%) | Yield (%) | Purity (%) | Yield (%) |
|---|---|---|---|---|---|---|---|
| No. | $-X$ | $-R^3$ | $-R^4$ | | | | |
| 1 | $-CH_3$ | $-C_2H_4OCOCH_3$ | $-C_2H_4OCOCH_3$ | 81.1 | 81.7 | 77.5 | 75.3 |
| 2 | " | $-C_2H_5$ | $-C_2H_4CN$ | 67.5 | 68.2 | 68.6 | 66.7 |
| 3 | " | " | $-C_2H_4OCOCH_3$ | 65.9 | 58.6 | 66.3 | 58.8 |
| 4 | " | $-CH_3$ | $-CH_3$ | 37.8 | 31.5 | 36.8 | 29.7 |
| 5 | $-OH$ | " | " | 32.3 | 37.0 | 51.5 | 49.6 |
| 6 | $-NHCOCH_3$ | $-C_2H_5$ | $-C_2H_5$ | 29.6 | 19.7 | 51.7 | 41.9 |

TABLE 6-continued

| | Coupling Component | | Purity | Yield | Purity | Yield |
|---|---|---|---|---|---|---|
| No. | −X | −R³ | −R⁴ | (%) | (%) | (%) | (%) |
| 7 | −NHCHO | " | " | 28.0 | 20.4 | 42.7 | 33.5 |

EXAMPLE 10 AND COMPARATIVE EXAMPLE 3

The same procedures as described in Example 9 and Comparative Example 1 were repeated except for using 20 mmols of 2-amino-3-cyano-5-(p-nitrophenylazo)thiophene as a diazo component and a coupling component shown in Table 7.

Purities and yields of the thus obtained disazo dyes are shown in Table 7.

TABLE 7

| | Coupling Component | Purity | Yield | Purity | Yield |
|---|---|---|---|---|---|
| No. | −R³ | −R⁴ | (%) | (%) | (%) | (%) |
| 1 | −C₂H₅ | −C₂H₄CN | 75.0 | 80.2 | 60.2 | 62.5 |
| 2 | −C₂H₄OCOCH₃ | −C₂H₄OCOCH₃ | 84.6 | 85.4 | 66.7 | 60.8 |

While the invention has been described in detail and with reference to specific embodiments thereof, it will be apparent to one skilled in the art that various changes and modifications can be made therein without departing from the spirit and scope thereof.

What is claimed is:

1. A process for preparing a disazo dye represented by the following formula:

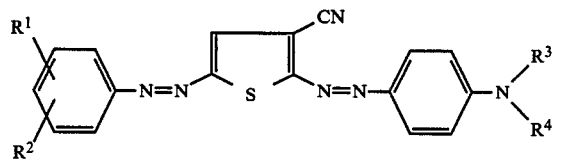

wherein $R^1$ and $R^2$ each represents hydrogen, halogen, nitro, trifluoromethyl, lower alkoxycarbonyl or lower alkylsulfonyl, $R^3$ represents lower alkyl or allyl or substituted lower alkyl or allyl, and $R^4$ represents substituted lower alkyl or allyl, said substituent in $R^3$ and $R^4$ being selected from the group consisting of hydroxy, lower alkoxy, phenoxy, lower alkanoyloxy, lower alkoxycarbonyloxy, lower alkoxycarbonyl, cyano, phenyl and tetrahydrofuryl, which comprises diazotizing an amine represented by the following formula:

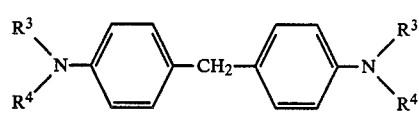

wherein $R^1$ and $R^2$ are the same as defined above, and coupling the diazotized product with a bis(N,N-disubstituted anilino)methane represented by the following formula:

wherein $R^3$ and $R^4$ are the same as defined above.

* * * * *